Figure 1:
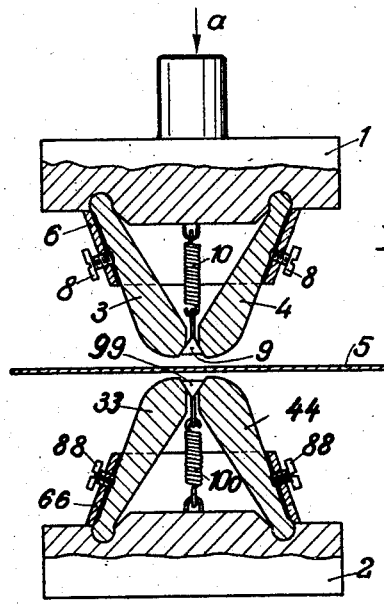

Aug. 13, 1935.  H. JUNKERS  2,010,996

TOOL FOR PRODUCING A CHANGE OF FORM IN SHEET METAL

Filed Sept. 24, 1932  2 Sheets-Sheet 1

Inventor:
Hugo Junkers

Aug. 13, 1935.   H. JUNKERS   2,010,996
TOOL FOR PRODUCING A CHANGE OF FORM IN SHEET METAL
Filed Sept. 24, 1932   2 Sheets-Sheet 2

Inventor:
Hugo Junkers
by Karlikrichatti
Atty.

Patented Aug. 13, 1935

2,010,996

UNITED STATES PATENT OFFICE 2,010,996

TOOL FOR PRODUCING A CHANGE OF FORM IN SHEET METAL

Hugo Junkers, Dessau, Germany, assignor to the firm Junkers-Flugzengwerk A. G., Dessau, Germany Application September 24, 1932, Serial No. 634,737
In Germany September 26, 1931

9 Claims. (Cl. 78—61)

My invention relates to a tool for producing a change of form in sheet metal, i. e., for upsetting or stretching the metal.

It has already been suggested, as described in my prior Patents 1,761,887, June 3, 1930, and 1,809,168, June 9, 1931, to provide two pairs of jaws for gripping the sheet metal on opposite sides, which are displaced with respect to each other and in this manner produce the required change of form. As described in the said patents, the jaws and the means for operating them are equipped with camming faces in such manner that the jaws of each pair while being applied to the sheet metal, are, at the same time, displaced laterally by the cooperation of the camming faces. The object of this arrangement is to effect the gripping of the sheet metal and the relative movement of the pairs of jaws by a single operation, but devices of this kind are complicated and expensive.

It is an object of the present invention to provide a simplified tool of the kind referred to which has a wide range of adaptability.

To this end I dispense with camming faces and provide a pair of heads or blocks which are adapted to perform relative movement, i. e., one of them may be stationary and the other movable, as will be described by way of example, or both may be movable. On each head I provide a pair of arms which are mounted to rock thereon. The free ends of the rocking arms in each pair are equipped with jaws for engaging opposite sides of a sheet-metal blank and the arms are so arranged that the jaws in each pair are displaced with respect to each other and upset or stretch the blank when the heads perform their relative movement.

In this manner, when the heads are moved toward each other, or the movable head is moved toward the stationary head the sheet-metal blank is first firmly gripped at opposite sides by the jaws of both pairs of arms. If the distance of the heads is further reduced, the arms of each pair act as a sort of toggle levers, their jaws being displaced with respect to each other so as to upset or to stretch the portion of the blank which is gripped between the jaws.

Means such as springs are preferably provided for returning the arms into their initial position after they have performed the upsetting or stretching operation, and the springs which in a tool for upsetting are tension springs, and in a tool for stretching are compression springs, are preferably connected to intermediate members having wedge faces at their opposite sides which are inserted between the arms of each pair and adapted to cooperate with the sides of the arms, so as to rock them about the points where they are fulcrumed in the corresponding head. The springs are preferably connected to the intermediate wedge members at one end and to the corresponding head at the other end.

For limiting the return movement of the arms toward their initial position, checks may be provided which may be made adjustable for varying the deformation produced on the blank.

The depth of the jaws may be very small so that the tool may also be used for sheet metal having a slightly curved surface.

In the drawings affixed to this specification and forming part thereof tools embodying my invention are illustrated diagrammatically by way of example.

Figure 2:
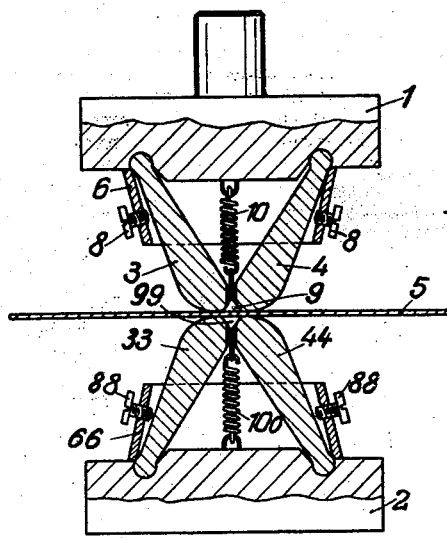
Figure 3:
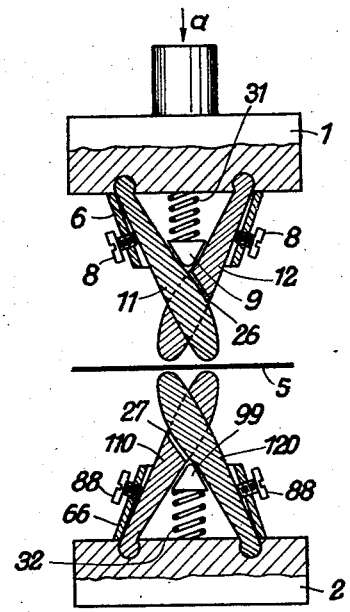
Figure 4:
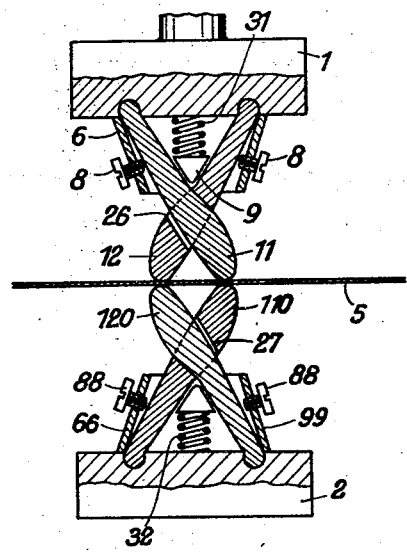

In the drawings:

Fig. 1 is a partly sectional elevation of an upsetting tool showing the tool in its initial or open position, Fig. 2 is a similar elevation showing the upsetting tool in its active or closed position after performing the upsetting operation, Fig. 3 is a partly sectional elevation showing a stretching tool in its initial, and Fig. 4 is a similar elevation showing the stretching tool in its closed position after performing the stretching operation.

Referring now to the drawings, and first to Figs. 1 and 2, the tool which may be inserted in a press of any suitable kind, for instance, an eccentric press, has two heads or blocks 1 and 2. In the present instance the upper head 1 is movable and the lower head 2 is a stationary abutment. 3, 4 are two arms which are mounted to rock in suitable bearings in the lower face of the movable head 1 at their upper ends. Jaws for engaging a sheet-metal blank 5 are formed at the free or lower ends of the arms. 9 is a wedge-shaped intermediate member inserted between the free ends of the arms 3, 4, the inner faces of the arms bearing on the wedge faces of the member 9. 10 is a spring which is secured to the member 9 at its lower and to the head 1 at its upper end and tends to draw the member toward the head 1 and to move the arms 3 and 4 apart and into their initial position. The movement of the arms in this direction is limited by a frame 6 which is preferably provided with checks, here shown as screws 8, so that the relative position of the arms 3 and 4 in their initial position may be varied. Obviously the action of the jaws on the sheet metal is determined by the position occupied by the jaws when gripping the metal.

A similar equipment is provided for the lower head or abutment 2, with a pair of arms 33 and 44, an intermediate member 99, a spring 100, a frame 66 and adjustable checks 88 for limiting the movement of the arms toward their initial position under the reaction of the spring 100.

The operation of the tool is as follows:

With the head 1 in its initial position with respect to the abutment 2, and the pairs of arms 3, 4 and 33, 44, also in their initial position, as illustrated in Fig. 1, a sheet-metal blank 5 is inserted between the four jaws of the arms and the head 1 is lowered in the direction of arrow $a$. When the jaws engage the blank 5 on opposite sides, the blank is gripped and upon further downward movement of the head 1, the jaws of each pair of arms move toward each other and upset the sheet metal, as shown in Fig. 2. At the same time the inner faces of the arms act on the wedge faces of the intermediate members 9 and 99, moving the members toward the blank 5 in opposite directions and putting tension on the springs 10 and 100.

When the operation has been performed, the head 1 is returned into its initial position in opposite direction to the arrow $a$. The springs 10 and 100, which had been stretched during the upsetting operation as shown in Fig. 2, now return the corresponding arms into their initial position by the wedge action of the members 9 and 99, spreading the arms apart until they are arrested by the adjustable checks 8 and 88.

The operation may be repeated if the area to be acted on by the jaws is wider than the relative distance of the jaws in their upsetting position, the blank 5 being fed as required.

Referring now to Figs. 3 and 4 which illustrate the stretching tool, the head 1 and the abutment 2 are provided as described with reference to Figs. 1 and 2, and equipped with means 6, 8 and 66, 88, as also described with reference to Figs. 1 and 2, for limiting the return movement of the arms toward their initial position. In this tool, however, the arms 11 and 12 at the head 1, and 110 and 120 at the abutment 2, are arranged crosswise, the arm 11 engaging in a slot or pocket 26 in the arm 12 and the arm 120 engaging in a similar slot or pocket 27 in the arm 110. By these means, the arms are pivotally connected. The intermediate members 9 and 99 are arranged above the pivotal connections of the respective arms and equipped with compression springs 31 at the head 1, and 32 at the abutment 2.

When the head 1 is lowered in the direction of the arrow $a$ from the initial position illustrated in Fig. 3, the jaws at the free ends of the arms are applied to the blank 5, as described with reference to Figs. 1 and 2, but in the stretching tool the jaws move apart after having engaged opposite sides of the blank, as shown in Fig. 4, the relative movement of the arms in the spreading direction being limited by the slots or pockets 26 and 27. As the jaws are spread apart, the intermediate members 9 and 99 are moved toward the head 1 and the abutment 2, respectively, compressing their springs 31 and 32. When the head 1 is retracted, the reaction of the spring, through the medium of the intermediate members 9 and 99, returns the arms into their initial position, the movement toward this position being limited by the checks 8 and 88, as described with reference to Figs. 1 and 2.

It will be understood from this description that the operation of the stretching tool is substantially similar to that of the upsetting tool and may also be repeated as often as required, the only distinctions being that in the stretching tool the jaws move apart, i. e., in opposite direction to the movement which is imparted to them in the upsetting tool, and the arms are returned into their initial position by compression and not by tension springs. If the heads 1 and 2 are arranged for movement in vertical direction— which is the rule—the intermediate member and its spring may be dispensed with in the upper pair of arms 3, 4 (Figs. 1 and 2) and 11, 12 (Figs. 3 and 4) as the arms in these pairs are returned to their initial position by gravity. In the lower pair of arms, however, the intermediate member and its spring are indispensable.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. A tool for producing a change of form in sheet metal, comprising a pair of heads adapted to perform relative movement, a pair of arms pivotally connected to each head at one of their ends, jaws on the free ends of said arms which are adapted to engage opposite sides of a sheet-metal blank, said arms being so arranged that the jaws in each pair are displaced with respect to each other when said heads perform their relative movement in a given direction, and intermediate members inserted between the arms of each pair, with wedge faces at their opposite sides adapted to cooperate with the arms.

2. A tool for producing a change of form in sheet metal, comprising in combination, two heads, one of which is arranged to move towards and away from the other one, a pair of arms pivoted to each head, jaws at the free ends of said arms and means on said heads, including a yieldingly supported member, for holding the arms of a pair in converging position.

3. A tool for producing a change of form in sheet metal, comprising in combination, two heads, one of which is arranged to move towards and away from the other one, a pair of arms pivoted to each head, jaws at the free ends of said arms and means on said heads, including a yieldingly supported member and a pair of checks, for holding the arms of a pair in converging position.

4. A tool for producing a change of form in sheet metal, comprising in combination, two heads, one of which is arranged to move towards and away from the other one, a pair of arms pivoted to each head, jaws at the free ends of said arms and means on said heads, including a yieldingly supported member and a pair of adjustable checks, for holding the arms of a pair in converging position.

5. A tool for producing a change of form in sheet metal, comprising in combination, two heads, one of which is arranged to move towards and away from the other one, a pair of arms pivoted to each head, jaws at the free ends of said arms and means on said heads, including a yieldingly supported wedge member, for holding the arms of a pair in converging position.

6. A tool for producing a change of form in sheet metal, comprising in combination, two heads, one of which is arranged to move towards and away from the other one, a pair of arms pivoted to each head, jaws at the free ends of said arms and means on said heads, including a spring and a wedge member, for holding the arms of a pair in converging position.

7. A tool for producing a change of form in sheet metal, comprising in combination, two heads, one of which is arranged to move towards and away from the other one, a pair of arms pivoted to each head, jaws at the free ends of said arms and means on said heads, including a tension spring and a wedge member, for holding the arms of a pair in converging position.

8. A tool for producing a change of form in sheet metal, comprising in combination, two heads, one of which is arranged to move towards and away from the other one, a pair of arms pivoted to each head, jaws at the free ends of said arms and means on said heads, including a compression spring and a wedge member, for holding the arms of a pair in converging position.

9. A tool for producing a change of form in sheet metal, comprising in combination, two heads, one of which is arranged to move towards and away from the other one, a pair of arms pivoted to each head, jaws at the free ends of said arms and means on said heads, including a yieldingly supported member, for holding the arms of a pair in converging and intersecting position.

HUGO JUNKERS.